L. MAYER.
VEHICLE SPRING.
APPLICATION FILED FEB. 1, 1911.

1,008,422.

Patented Nov. 14, 1911.
2 SHEETS—SHEET 2.

Witnesses.
Harry Opsahl
A. H. Opsahl

Inventor:
Louis Mayer.
By his Attorneys
Williamson Merchant

UNITED STATES PATENT OFFICE.

LOUIS MAYER, OF MANKATO, MINNESOTA.

VEHICLE-SPRING.

1,008,422.

Specification of Letters Patent. Patented Nov. 14, 1911.

Application filed February 1, 1911. Serial No. 605,890.

*To all whom it may concern:*

Be it known that I, LOUIS MAYER, a citizen of the United States, residing at Mankato, in the county of Blue Earth and State of Minnesota, have invented certain new and useful Improvements in Vehicle-Springs; and I do hereby declare the following to be a full, clear, and exact description of the invention, such as will enable others skilled in the art to which it appertains to make and use the same.

My invention has for its object to provide an improved vehicle spring especially adapted for supporting the bodies of automobiles from their running gears.

To the above ends, the invention consists of the novel devices and combinations of devices hereinafter described and defined in the claims.

In the accompanying drawings which illustrate the invention, like characters indicate like parts throughout the several views.

Figure 1:
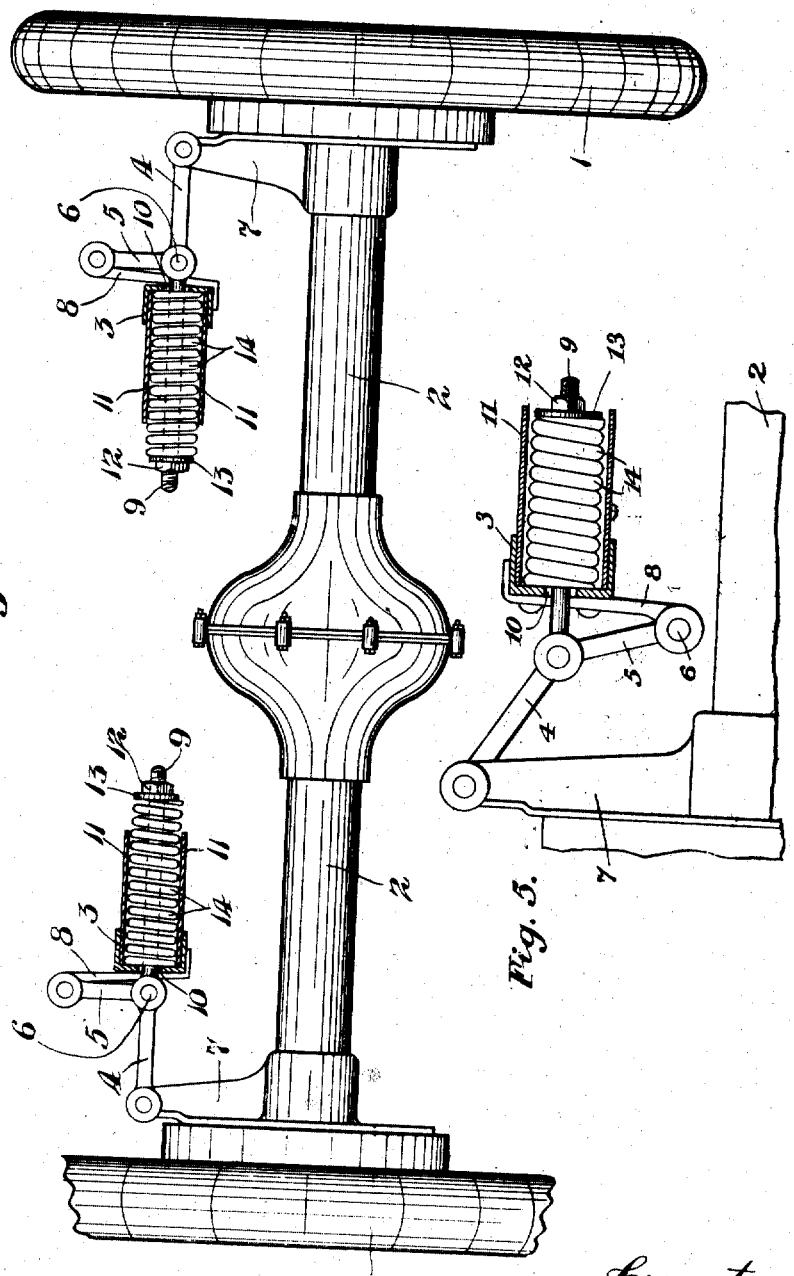
Figure 2:
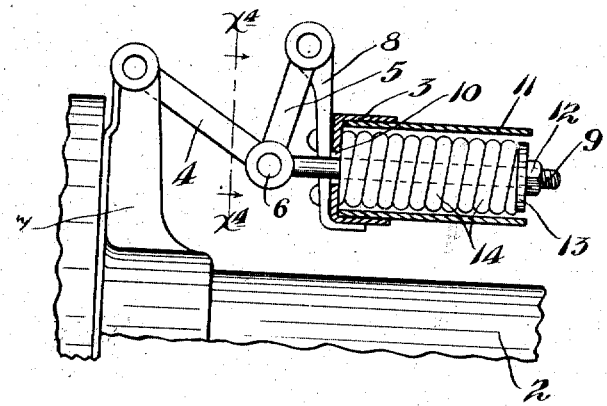
Figure 3:
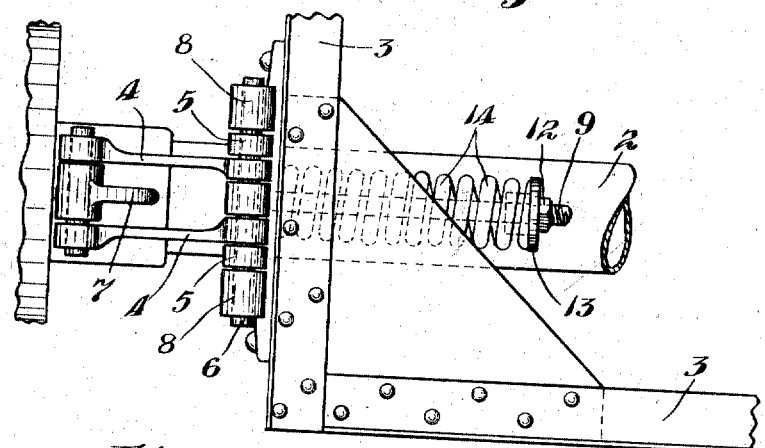
Figure 4:
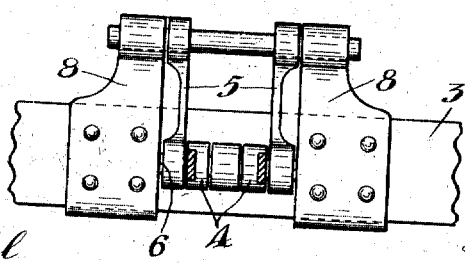

Referring to the drawings, Figure 1 is a view partly in rear elevation and partly in vertical section and with some parts broken away, showing the improved springs applied to the rear portion of an automobile, the parts being in normal position; Fig. 2 is a fragmentary view corresponding in its general character to Fig. 1, but showing the spring compressed; Fig. 3 is a plan view of the parts shown in Fig. 2 but showing the parts in their normal positions; Fig. 4 is a section taken approximately on the line $w^4 x^4$ of Fig. 2; and Fig. 5 is a view corresponding to Fig. 2 but showing a slightly modified form of the device.

Of the parts of the automobile, as shown, the numeral 1 indicates the rear wheels, the numeral 2 the rear axle casing and the numeral 3 the frame of the automobile body, the latter, as shown, being a rectangular metal structure. The body frame 3 will be supported from the running gear of the machine preferably by four of the improved vehicle springs hereinafter described, two thereof being connected to the rear axle casing and the other two thereof being connected to the front axle just inward of the customary steering knuckles.

Each of the improved vehicle springs comprises a toggle and a spring arranged to normally hold the said toggle in a predetermined position to yieldingly support the vehicle body. As preferably constructed, the toggles are made up of parallel horizontal links 4 and parallel vertical links 5 pivotally connected by a coupling pin or bolt 6. The ends of the links 4 are pivoted to anchor brackets 7 while the ends of the links 5 are pivoted to anchor brackets 8. The anchor brackets 7 at the rear are rigidly secured to the rear axle casing 2, while the anchor brackets 7, not shown but which will be at the front of the machine, are, as before indicated, rigidly secured to the front axle inward of its steering knuckles. The anchor brackets 8 are riveted or otherwise rigidly secured to the sides of the body frame 3. Plungers 9 are pivotally connected to the intermediate portion of the coupling bolt 6 of the respective toggles and these plungers are, as shown, extended through perforations 10 in the body frame 3 and through spring casings or boxes 11 secured to said frame. The inner ends of the plungers 9 are threaded and, as shown, provided with nuts 12 and coöperating washers 13. Coiled springs 14 are placed within the boxes 11 and are compressed between the coöperating washers 13 and the sides of the body frame 3. By adjustments of the nuts 12, the tension of the springs 14 may be varied to adapt the vehicle to carry different loads. The springs 14 exert yieldingly force which tends to hold the toggle links 4 in horizontal positions and the toggle links 5 in vertical positions shown in Fig. 1.

By reference to Fig. 1, it will be noted that the coöperating axially alined springs 14 on the opposite sides of the vehicle hold the so-called horizontal links 4 alined in a horizontal plane and normally re-act through the links 4. Hence, they exert force tending to prevent the body frame 3 from moving downward and, furthermore, they exert a force which tends to hold the vehicle frame from being raised. In this normal position of the parts, the ends of the links 4 and 5 do not engage with the sides of the frame 3 but, on the contrary, there is a slight clearance between the said parts. This prevents pounding when the parts assume normal positions after having been moved into the position shown in Fig. 2 by an excessive force produced, for instance, in running over an obstacle or a rut in the roadbed. It may be here stated that the tension of the springs 14 will usually be such that they will carry the load with the toggles in the normal positions shown in Fig. 1 while on a smooth road or while standing still, but will yield to relieve the vehicle body from jars in running over rough roads, over obstructions or over ruts in the road. However, this exact adjustment is not essential and the springs will, in fact, under heavy loads, frequently yield so as to permit parts to move more or less toward the position shown in Fig. 2.

From one point of view, the links 4 and plungers 9 constitute toggles and the links 5 constitute hangers for connecting the toggles to the vehicle frame. The said links 5, in some instances, instead of extending upward from their pivotal connection to the links 4, may extend downward and have their lower ends attached to the vehicle frame.

The spring devices described are not only efficient in resisting downward strains, but they are well adapted to resist the recoil or return movements under re-actions of the springs 14, inasmuch as they do not return to normal positions against positive stops but simply assume positions shown in Fig. 1, from which positions they may be yieldingly moved in either direction, to-wit, either upward or downward. Otherwise stated, the spring connections are shock-absorbing in their action because of the fact that the re-acting force of the springs 14 are not abruptly thrown against a stop but are moved toward a dead center by movements of the intermediate toggle joints on the arc of a circle. The spring connections have this further advantage that, if one of the springs 14 should be broken, the vehicle frame will not be dropped, but the spring connection having the broken spring will simply lose its resilience and will maintain the position shown in Fig. 2 with the coils of the said springs 14 pressed together and affording a positive stop. Furthermore, the spring connections are of comparatively small cost and may be easily repaired in case one or more of the springs 14 should be broken.

What I claim is:—

1. The combination with a vehicle running gear and a body frame, of normally horizontal and vertical pivotally connected toggle links, the said horizontal links being pivotally connected to said running gear and said vertical links being pivotally connected to said frame, plungers pivotally connected to the toggles made up of said horizontal and vertical links, and springs re-acting against said plungers and against said body frame and exerting a force tending to hold said toggles in predetermined buckled positions.

2. The combination with a vehicle running gear and a body frame, both thereof having anchor brackets, of normally buckled toggles pivotally connected to the anchor brackets of said running gear and frame, plungers pivotally connected to the intermediate joints of said toggles, and springs re-acting against said plungers and against said body frame, substantially as described.

3. The combination with a vehicle running gear and a body frame, both thereof having anchor brackets, of normally buckled toggles pivotally connected to the anchor brackets of said running gear and frame, plungers pivotally connected to the intermediate joints of said toggles, springs reacting against said plungers and against said body frame, and means for adjusting the tension of said springs, substantially as described.

4. The combination with a vehicle running gear and a body frame, both thereof having anchor brackets, of normally buckled toggles pivotally connected to the anchor brackets of said running gear and frame, plungers pivotally connected to the intermediate joints of said toggles, springs reacting against said plungers and against said body frame, and nuts on the ends of said plungers for adjusting the tension of the said springs, substantially as described.

In testimony whereof I affix my signature in presence of two witnesses.

LOUIS MAYER.

Witnesses:
ALICE V. SWANSON,
HARRY D. KILGORE.